US007302252B2

(12) United States Patent
Okochi

(10) Patent No.: US 7,302,252 B2
(45) Date of Patent: Nov. 27, 2007

(54) AUTHENTICATION SYSTEMS, WIRELESS COMMUNICATION TERMINALS, AND WIRELESS BASE STATIONS

(75) Inventor: Toshio Okochi, Musashino (JP)

(73) Assignee: Hitachi, Ltd., Tokyo (JP)

( * ) Notice: Subject to any disclaimer, the term of this patent is extended or adjusted under 35 U.S.C. 154(b) by 31 days.

(21) Appl. No.: 11/211,597

(22) Filed: Aug. 26, 2005

(65) Prior Publication Data

US 2006/0281441 A1 Dec. 14, 2006

(30) Foreign Application Priority Data

Jun. 13, 2005 (JP) ............................. 2005-172146

(51) Int. Cl.
*H04M 1/66* (2006.01)
(52) U.S. Cl. ...................... 455/411; 380/270; 380/273; 380/247; 705/14; 713/380
(58) Field of Classification Search ................ 455/411, 455/423.5, 410, 435.1, 435.2; 713/380; 380/247, 380/270, 273; 705/14
See application file for complete search history.

(56) References Cited

U.S. PATENT DOCUMENTS

| 5,402,490 | A | * | 3/1995 | Mihm, Jr. .................... 380/247 |
| 5,541,977 | A | * | 7/1996 | Hodges et al. ............... 455/411 |
| 5,551,073 | A | * | 8/1996 | Sammarco ................... 455/411 |
| 6,148,404 | A | * | 11/2000 | Yatsukawa ....................... 726/2 |
| 6,192,474 | B1 | * | 2/2001 | Patel et al. ................... 713/171 |
| 6,490,687 | B1 | * | 12/2002 | Nagai ............................ 726/9 |
| 6,591,364 | B1 | * | 7/2003 | Patel ........................... 713/170 |
| 7,117,266 | B2 | * | 10/2006 | Fishman et al. ............. 709/228 |
| 2005/0033994 | A1 | * | 2/2005 | Suzuki ........................ 713/202 |
| 2006/0013398 | A1 | * | 1/2006 | Halasz et al. ................ 380/273 |
| 2006/0168657 | A1 | * | 7/2006 | Baentsch et al. ............. 726/21 |

FOREIGN PATENT DOCUMENTS

JP 2004-282295 3/2003

OTHER PUBLICATIONS

Newsome, James, et al., "The Sybil Attack in Sensor Networks: Analysis & Defenses", Carnegie Mellon University, pp. 10.
Poupard, Guillaume, et al., Security Analysis of a Practical "on the fly" Authentication and Signature Generation:, Advances in Cryptology—EUROCRYPT, 1998, LNCS 1403, pp. 422-436.

* cited by examiner

*Primary Examiner*—Rafael Perez-Gutierrez
*Assistant Examiner*—Nimesh Patel
(74) *Attorney, Agent, or Firm*—Reed Smith LLP; Stanley P. Fisher, Esq.; Juan Carlos A. Marquez, Esq.

(57) ABSTRACT

This invention provides enhanced safety for operation of a wireless communication terminal authentication system. This invention is an authentication system, which comprises a wireless communication terminal and a base station for establishing wireless communication with the wireless communication terminal. The wireless communication terminal comprises a terminal side receiver transmitter module for exchanging information with the base station, and a terminal side recording module for recording use and thrown type authentication information. The terminal side recording module records plural pieces of use and thrown type authentication information. The terminal side receiver transmitter module transmits one of the plural pieces of use and thrown type authentication information to the base station and then invalidates the transmitted use and thrown type authentication information. The base station performs an authentication process with the received piece of use and thrown type authentication information.

10 Claims, 6 Drawing Sheets

| SECRET PART OF COUPONS | PUBLIC PART OF COUPONS | STATUS |
|---|---|---|
| 9a82d6f766 | 79b01ea342 | 1 |
| e7201bd121 | 6c01e156fa | 1 |
| . | . | . |
| . | . | . |
|  |  |  |
|  |  |  |

*Fig.4*

| TERMINAL AUTHENTICATION KEY ID | TERMINAL PUBLIC KEY | STATUS |
|---|---|---|
| 007 | 16d7940c63b467f9b870 | 1 |
| 005 | c164a87190b79c8d0f46 | 1 |
| . | . | . |
| . | . | . |
|  |  |  |
|  |  |  |

*Fig.5*

| SECRET PART OF COUPONS | PUBLIC PART OF COUPONS | TERMINAL ID | STATUS |
|---|---|---|---|
| 9a82d6f766 | 79b01ea342 | 001 | 1 |
| e7201bd121 | 6c01e156fa | 001 | 1 |
| 8c12f8e429 | a107f98079 | 003 | 1 |
| 256e722b79 | 835f49ea12 | 003 | 1 |
| . | . | . | . |
| . | . | . | . |
| . | . | . | . |

AUTHENTICATION SYSTEMS, WIRELESS COMMUNICATION TERMINALS, AND WIRELESS BASE STATIONS

CLAIM OF PRIORITY

The present application claims priority from Japanese patent application P2005-172146 filed on Jun. 13, 2005, the content of which is hereby incorporated by reference into this application.

FIELD OF THE INVENTION

This invention relates to an authentication system for wireless communication terminal authentication by a wireless base station, and more particularly to an authentication system that uses use and thrown type authentication information.

BACKGROUND OF THE INVENTION

In recent years, a sensor net is widely used. Within the sensor net, many wireless communication terminals are connected by short-distance wireless communication links. However, there are various problems with the sensor net (refer to James Newsome and Elaine Shi and Dawn Song and Adrian Perrig "The sybil attack in sensor networks: analysis & defense", IPSN'04: Proceedings of the third international symposium on Information processing in sensor networks, Berkeley, Calif., USA, 2004, ISBN 1-58113-846-6, p. 259-268, ACM Press). In a certain situation, corrupt data may flow into the sensor net due to the use of a forged wireless communication terminal. In another situation, communication resources may be occupied to cause a denial of service.

To avoid such illegal accesses, it is necessary that the wireless base station perform a stringent authentication process on wireless communication terminals and reject any illegal terminal when it issues a request for connection to the network.

Under these circumstances, for instance, JP 2004-282295 A discloses a wireless communication terminal authentication system, which is based on a one-time password authentication method. When the one-time password authentication method is used, the password is changed whenever authentication is performed.

Further, for instance, Poupard and J. Stern "Security analysis of a practical 'on the fly' authentication and signature generation, Advances in cryptology—Eurocrypt' 98, Lecture Notes in Computer Science 1403, Springer-Verlag" 1998, p. 422-436 proposes a technology for using digital coupons, which cannot be used repeatedly, instead, for instance, of transportation tickets.

SUMMARY OF THE INVENTION

A challenge-response authentication method is used as a basic version of the one-time password authentication method. The challenge-response type authentication method provides terminal identification and authentication by verifying that a wireless communication terminal possesses a unique encryption key.

The challenge-response authentication method can be classified into two types. One method uses a secret key cryptosystem. The other method uses a public key cryptosystem.

If the method based on the secret key cryptosystem is used, it is necessary that the wireless base station possess a wireless communication terminal's secret key. In a wide-area sensor net in which a vehicle-mounted sensor or the like is used, however, the wireless communication terminal moves among plural wireless base stations. When adopting this operation style, it is necessary that the terminal's secret key be distributed beforehand to many wireless base stations. Therefore, it is highly likely that the information about the secret key will leak.

If, on the other hand, the method based on the public key cryptosystem is used, it is not necessary that the wireless communication terminal and wireless base stations share the secret key. Therefore, the wireless communication terminal can communicate with any wireless base station positioned near a move destination.

However, when using the method based on the public key cryptosystem, the volume of calculations performed by the terminal increases because the cryptographic process performed for authentication is complicated. In such a situation, processing operations cannot be fully performed by a small-size wireless communication terminal that operates from a small-size battery, solar battery, or power generation device. Thus, the method based on the public key cryptosystem cannot properly be applied to a small-size wireless communication terminal. Under these circumstances, an authentication system is demanded that is applicable to a small-size wireless communication terminal moving over a wide area and permits the terminal to communicate with any wireless base stations.

It is an object of this invention to provide a wireless communication terminal authentication system that adopts use and thrown type authentication information to assure enhanced safety of operation.

According to an embodiment of this invention, there is provided an authentication system comprising a wireless communication terminal and a base station establishing wireless communication with the wireless communication terminal. The wireless communication terminal comprises a sensor, a terminal side receiver transmitter module exchanging information with the base station, a terminal side authentication module performing an authentication process in relation to the base station, and a terminal side recording module recording use and thrown type authentication information. The base station comprises a base station side receiver transmitter module exchanging information with the wireless communication terminal and a base station side authentication module performing an authentication process in relation to the wireless communication terminal. The terminal side recording module records plural pieces of use and thrown type authentication information. The terminal side receiver transmitter module transmits one of the plural pieces of use and thrown type authentication information to the base station and then invalidates the transmitted use and thrown type authentication information. The base station performs an authentication process with the received piece of use and thrown type authentication information.

Since the authentication system according to an embodiment of this invention reduces the volume of calculations performed on the wireless communication terminal side, identification or authentication can be achieved for a small-size wireless communication terminal whose computational resource and power supply capacity are limited. Further, the wireless base station uses only public information to authenticate a wireless communication terminal. Therefore, there is no risk of information leakage. Consequently, highly safe operations can be conducted.

BRIEF DESCRIPTION OF THE DRAWINGS

The present invention can be appreciated by the description which follows in conjunction with the following figures, wherein:

FIG. 4 shows the structure of a list of coupons according to one embodiment of this invention;

FIG. 5 shows the structure of a list of terminal authentication keys, which is provided in a wireless base station according to one embodiment of this invention;

DESCRIPTION OF THE PREFERRED EMBODIMENTS

Embodiments of this invention will now be described with reference to the accompanying drawings.

Figure 1:
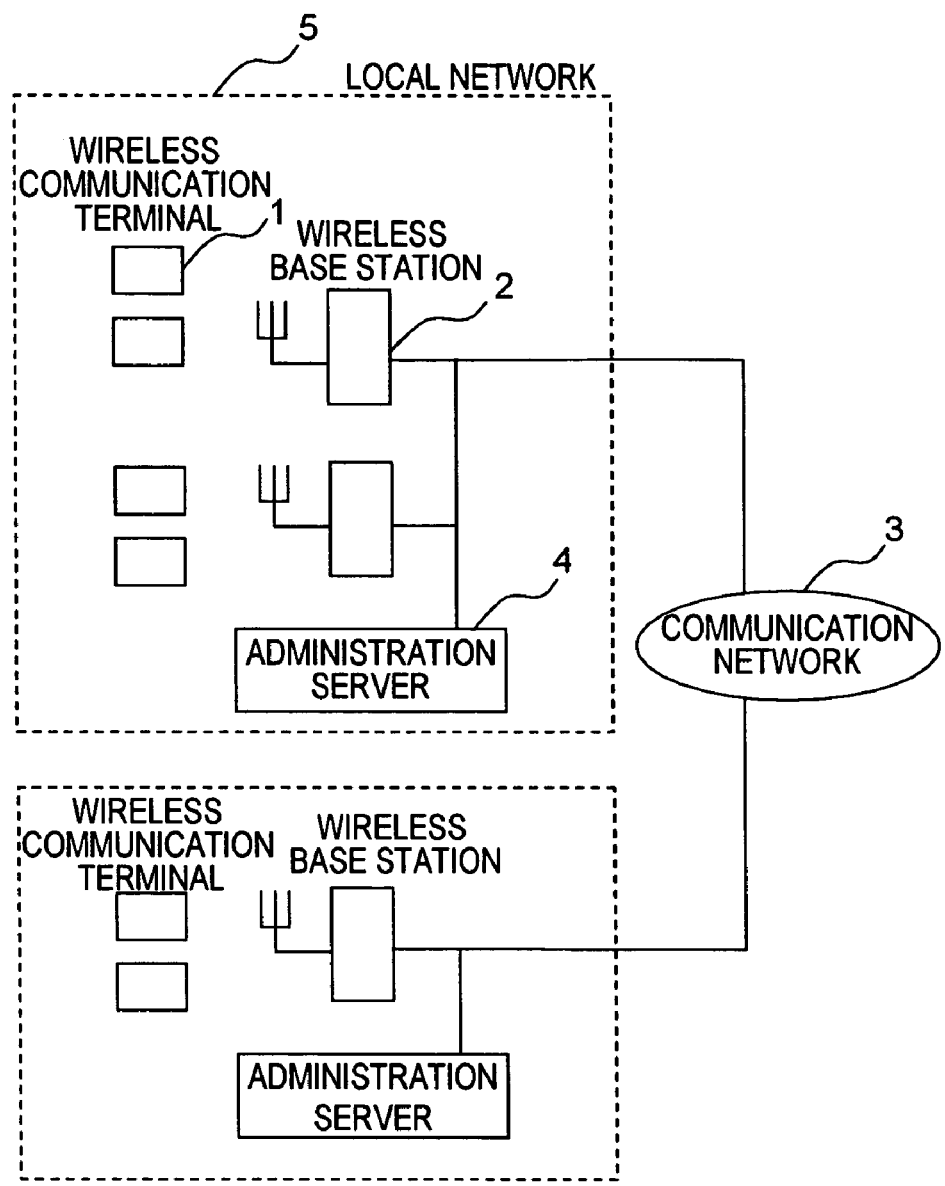
FIG. 1 is a block diagram illustrating an authentication system according to one embodiment of this invention.

FIG. 1 is a block diagram illustrating an authentication system according to one embodiment of this invention.

The authentication system comprises a communication network 3 and plural wireless communication networks (local networks) 5. The communication network 3 is connected to the plural local networks 5.

Each local network 5 includes an administration server 4, a wireless base station (access point) 2, and plural wireless communication terminals 1. Each local network 5 includes at least one wireless base station 2.

The administration server 4 is connected to the wireless base station 2 via a network. The administration server 4 communicates with the wireless communication terminals 1 via the wireless base station. Alternatively, the administration server 4 may comprise wireless or wired communication modules, which can directly communicate with the wireless communication terminals 1 without via the wireless base station 2.

The administration server 4 initializes the wireless communication terminals 1 and manages the communication between the wireless base station 2 and wireless communication terminals 1 within the local network 5. At the time of wireless communication terminal initialization, the administration server 4 writes an encryption key and authentication key in storage media of the wireless communication terminals 1. Further, the administration server 4 shares the encryption key and authentication key with the wireless base station 2 within the same local network. The wireless communication terminals 1 can safely communicate with the wireless base station 2 in a home network by using the encryption key and authentication key.

The wireless base station 2 wirelessly communicates with the wireless communication terminals 1. Further, the wireless base station 2 is connected to the communication network 3. The wireless base station 2 collects the information received from the wireless communication terminals 1 and transmits the collected information to the communication network 3.

Each wireless communication terminal 1 includes a power supply, a sensor 11 (refer to FIG. 2), and a wireless communication device. When the wireless communication terminal 1 starts up for the first time, it is initialized by the administration server 4 in a certain local network 5. The local network to which the wireless communication terminal 1 is connected at the time of initialization is called a home network.

The wireless communication terminal 1 can connect to a local network 5 other than the home network and establish connection. The local networks other than the home network are called visiting networks.

When the wireless communication terminal 1 physically moves from a local network 5 to a visiting network and issues a request for connection or moves from one visiting network to another and issues a request for connection, each visiting network checks that the wireless communication terminal 1 is a genuine wireless communication terminal that is registered in the authentication system. After verifying that the wireless communication terminal 1 is genuine, each visiting network grants connection permission. The method for authenticating whether the wireless communication terminal 1 is a genuine wireless communication terminal 1 that is registered in the authentication system will be described later with reference to FIG. 3.

Figure 2:
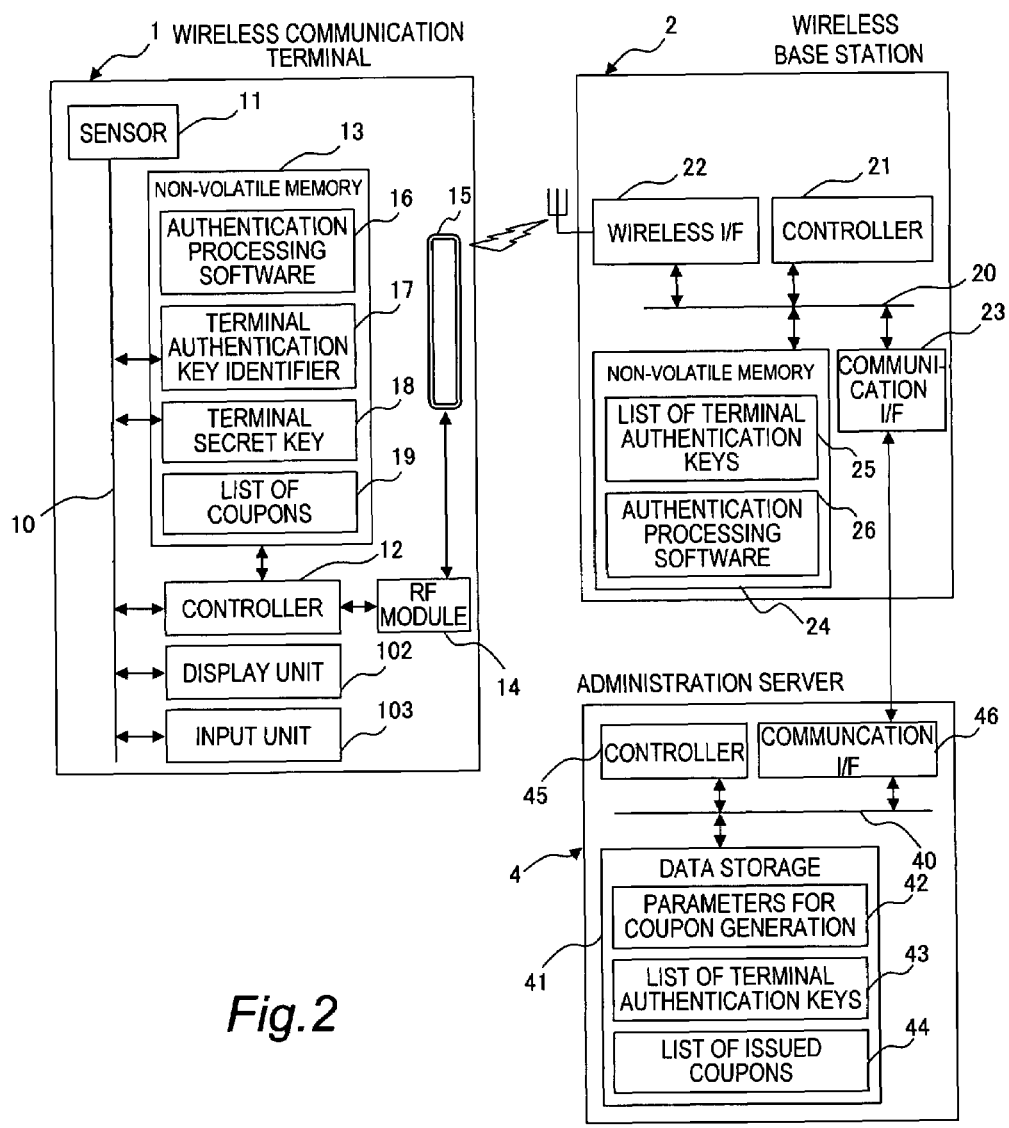
FIG. 2 is a block diagram illustrating the configurations of a wireless communication terminal, a wireless base station, and an administration server according to one embodiment of this invention.

FIG. 2 is a block diagram illustrating the wireless communication terminal 1, wireless base station 2, and administration server 4 according to one embodiment of this invention.

The wireless communication terminal 1 comprises a sensor 11, a controller 12, a non-volatile memory 13, a radio-frequency module 14, an antenna 15, a display unit 102, and an input unit 103. The sensor 11, controller 12, non-volatile memory 13, display unit 102, and input unit 103 are connected to a bus 10.

The sensor 11 detects, for instance, temperature, humidity, illuminance, acceleration, and infrared radiation. The sensor 11 is not an essential component of the wireless communication terminal 1.

The controller 12 includes a CPU for communication control and a RAM that is used as a work area for the CPU operation. Further, the wireless communication terminal 1 includes the non-volatile memory 13, which is externally attached to the controller 12.

The non-volatile memory 13 stores the information that is used for authentication processing. For example, an EEPROM is used as the non-volatile memory 13. The non-volatile memory 13 stores authentication processing software 16, a terminal authentication key identifier 17, a terminal secret key 18, and a list of coupons 19.

Figure 3:
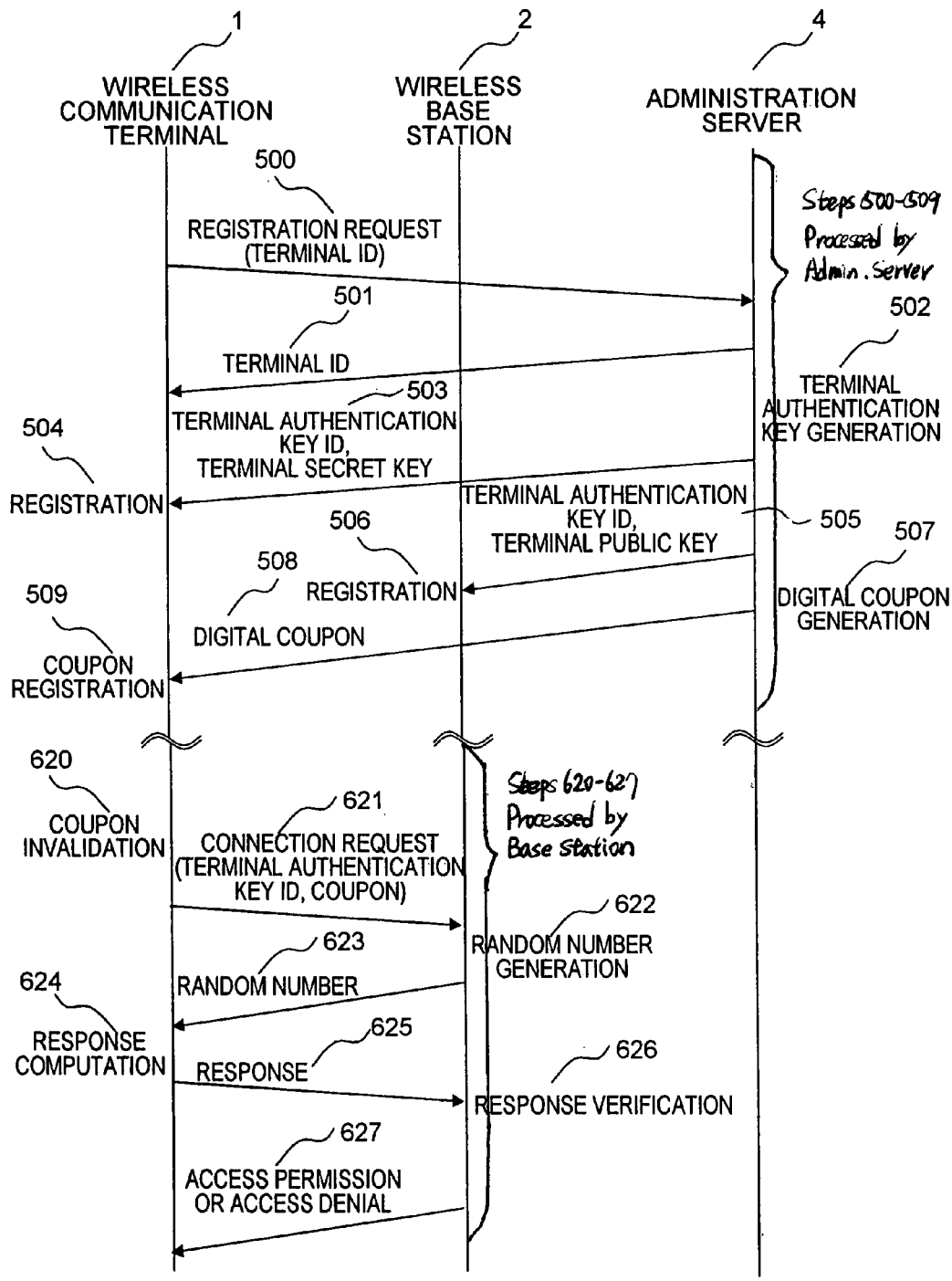
FIG. 3 is a flowchart illustrating an initialization process and authentication process according to one embodiment of this invention.

The authentication processing software 16 calculates a response at the time of authentication processing (refer to FIG. 3). The controller 12 executes the authentication processing software 16 to configure an authentication module on the wireless communication terminal side.

The terminal authentication key identifier 17 is generated by the administration server 4 at the time of initialization. The terminal authentication key identifier 17 is used to identify a terminal authentication key that is possessed by the wireless communication terminal 1.

The terminal secret key 18 is generated by the administration server 4 at the time of initialization. The terminal secret key 18 is used to calculate a response at the time of authentication processing.

The list of coupons 19 is a list of digital coupons that are issued by the administration server 4. Once a digital coupon is used for authentication processing, it is invalidated. When a new digital coupon is issued by the administration server 4, an invalid digital coupon recorded in the list of coupons 19 is updated to the new digital coupon. The list of coupons 19 will be described later with reference to FIG. 4.

The display unit 102 comprises a display that indicates the status of communication with the wireless base station 2 and the status of remaining digital coupons. The input unit 103 comprises various operating controls (switches, buttons, etc.) for the wireless communication terminal 1. When the input unit 103 is operated to enter a signal, the signal is transmitted to the controller 12 and a predefined process is performed. The display unit 102 and/or input unit 103 are not essential components of the wireless communication terminal 1.

The antenna 15 transmits signals to and receives signals from the wireless base station 2. The transmitted/received information is input into/output from the controller 12 via the radio-frequency module 14.

The wireless base station 2 comprises a wireless interface 22, a controller 21, a non-volatile memory 24, and a communication interface 23. The wireless interface 22, controller 21, non-volatile memory 24, and communication interface 23 are connected via a bus 20.

The wireless interface 22 includes an antenna and exchanges signals with the wireless communication terminal 1. The controller 21 comprises a CPU for exercising communication control and a RAM that is used as a work area for communication. Further, the wireless base station 2 includes the non-volatile memory 24, which is externally attached to the controller 21.

The non-volatile memory 24 stores the information that is used for authentication processing. For example, an EEPROM is used as the non-volatile memory 24. The non-volatile memory 24 stores a list of terminal authentication keys 25 and authentication processing software 26.

The list of terminal authentication keys 25 is a list of terminal authentication keys that are given to wireless communication terminals 1. The list relates to all wireless communication terminals 1 that may connect to a wireless base station 2 in which the list of terminal authentication keys 25 is stored. The wireless base stations 2 to which a wireless communication terminal 1 may connect are wireless base stations 2 within a home network for the wireless communication terminal 1, wireless base stations 2 in local networks 5 near the home network, and wireless base stations 2 in local networks within a predefined range to which the wireless communication terminal 1 may move.

The authentication processing software 26 generates the random number to be transmitted to the wireless communication terminal 1, and verifies a received response (refer to FIG. 3). The controller 21 executes the authentication processing software 26 to configure an authentication side of the module on the wireless base station 2.

The communication interface 23 is connected to the communication network 3 via a network (e.g., Ethernet). The communication interface 23 exchanges information with the administration server 4, which is connected to the communication network 3.

The administration server 4 comprises a controller 45, a communication interface 46, and a data storage (e.g. hard disk drive) 41. The controller 45, communication interface 46, and data storage 41 are connected via a bus 40.

The controller 45 includes a CPU, a ROM that stores, a program etc., and a RAM that is used as a work area for the CPU operation.

The data storage 41 stores parameters for coupon generation 42, a list of terminal authentication keys 43, and a list of issued coupons 44.

The parameters for coupon generation 42 are generated by the administration server 4. A selected parameter for coupon generation 42 is used to issue a digital coupon at the time of initialization of the wireless communication terminal 1. The digital coupon can only be used for only one authentication process. This invention is characterized by the fact that an already used digital coupon is invalidated as a used coupon.

The list of terminal authentication keys 43 is a list of terminal authentication keys for wireless communication terminals 1 that are initialized by the administration server 4. When a registration request is issued by the wireless communication terminal 1, the administration server 4 initializes the wireless communication terminal 1. Upon completion of initialization, the administration server 4 adds the information about a generated terminal authentication key to the list of terminal authentication keys 43.

The list of issued coupons 44 is a list of digital coupons that are issued by the administration server 4. No matter whether plural digital coupons are issued to plural wireless communication terminals 1, the single list of issued coupons 44 stores the information about all the digital coupons.

FIG. 3 is a flowchart illustrating an initialization process and an authentication process according to one embodiment of this invention.

The administration server 4 registers a wireless communication terminal 1, issues a digital coupon to the wireless communication terminal 1, and performs other initialization steps. The coupon issue process may be performed after the registration process or performed simultaneously with the registration process. The wireless communication terminal 1 cannot be properly used if it is not initialized at startup.

First of all, the registration process (from 500 to 506) for the wireless communication terminal 1 will be described.

Upon startup, the wireless communication terminal 1 requests the administration server 4 for registration (500). If no terminal identifier is includes in a received registration request, the administration server 4 judges that the wireless communication terminal 1, which transmitted the registration request, was turned on for the first time, and then generates a terminal identifier for identifying the wireless communication terminal 1. The administration server 4 registers the generated terminal identifier in the list of terminal authentication keys 43. Further, the administration server 4 transmits the terminal identifier to the wireless communication terminal 1 (501).

Alternatively, a terminal identifier may be set beforehand for each wireless communication terminal 1. In such an instance, when a wireless communication terminal 1 starts up, it transmits its terminal identifier to the administration server 4 to make a request for registration (500). The administration server 4 receives a registration request containing the terminal identifier from the wireless communication terminal 1, and then registers the terminal identifier in the list of terminal authentication keys 43. Then, as described later, the administration server 4 generates a terminal authentication key and digital coupon in accordance with the terminal identifier.

When the terminal identifier is registered in the list of terminal authentication keys 43, the home network for the wireless communication terminal 1 is determined.

Next, the administration server 4 generates a terminal authentication key unique to the wireless communication terminal 1 (502). At the same time, the administration server 4 generates a terminal authentication key identifier for identifying the terminal authentication key. The generated terminal authentication key and terminal authentication key identifier are associated with the terminal identifier and registered in the list of terminal authentication keys 43 (refer to FIG. 6).

The terminal authentication key includes a terminal authentication key secret part 433 and a terminal authentication key public part 434. The administration server 4 generates a random number s, handles it as the terminal authentication key secret part 433, and calculates the expression $$v = g^{-s} \bmod p$$

with the selected random number s. The calculated value v is then handled as the terminal authentication key public part 434. The values g and p are parameters for coupon generation 42, and their details will be described later.

The terminal authentication key secret part 433 is used for the terminal secret key 18, whereas the terminal authentication key public part 434 is used for the terminal public key 254.

The algorithm for implementing a use and thrown type digital coupon is not limited to a method that is described in conjunction with the present embodiment. Any identification algorithm in that it is possible to perform in advance major calculations of an authentication process to be performed by the wireless communication terminal 1. For example, the Okamoto-identification scheme may be used. For the Okamoto-identification scheme, refer to T. Okamoto "Provably secure and practical identification schemes and corresponding signature schemes," Advances in cryptology—Crypt'92, Lecture Notes in Computer Science 740, Springer-Verlag, 1993, p. 31-53.

Next, the administration server 4 transmits the generated terminal authentication key identifier and terminal authentication key secret part (terminal secret key) 18 to the wireless communication terminal 1 (503). The wireless communication terminal 1 receives the transmitted information and records it in the non-volatile memory 13 (504). The administration server 4 transmits the generated terminal authentication key identifier and terminal authentication key public part (terminal public key) 254 to a wireless base station 2 to which the wireless communication terminal 1 having the terminal public key 254 may connect (505). The wireless base station 2 receives the transmitted information and records it in the list of terminal authentication keys 25 (FIG. 5) within the non-volatile memory 24 (506).

Alternatively, the terminal public key 254 may be transmitted to the wireless base station 2 when a connection request is received from the wireless communication terminal 1 as described later. In such an instance, the wireless base station 2 receives the connection request and issues a request to the administration server 4 of the home network for the wireless communication terminal 1 in order to acquire the terminal public key 254.

A coupon issuance process (from 507 to 509) will now be described.

The administration server 4 generates parameters for coupon generation 42. The parameters for coupon generation 42 are then used to generate a digital coupon for the wireless communication terminal 1 (507). The coupon generation parameters 42 possessed by the administration server 4 of the home network determined by the registration process are used in a coupon generation process for the wireless communication terminal 1.

The parameters for coupon generation 42 first generate prime number p, which has a predetermined number of digits, and prime number q, which is smaller than p and a prime factor of p−1. The parameters are then used to generate integer g (0<g<p), which is such that the p-based modular system order of g is q. A pair of integers satisfying these conditions are generated, for instance, by using a technology that is described in Alfred J. Menezes, Paul C. van Oorschot, Scott A. Vanstone "Handbook of Applied Cryptography," CRC Press, 1996, ISBN: 0-8493-8523-7, chapter 4.

As a parameter for coupon generation 42, one of plural prepared parameters may be used. An alternative is to repeatedly use a single parameter. The parameters for coupon generation 42 may be generated by the administration server 4 as far as secrecy and safety are assured. An alternative is to let the administration server 4 acquire externally generated parameters and use them as the parameters for coupon generation 42.

The digital coupon includes a public part of coupons 192 and a secret part of coupons 191. The administration server 4 generates a random number x and calculates the public part of coupons (value t) using following expression.

$$t = g^x \bmod p$$

The value x becomes the secret part of coupons 191, whereas the value t becomes the public part of coupons 192. The administration server 4 issues plural use and thrown type digital coupons to the wireless communication terminal 1. The formula for the use and thrown type digital coupons is not limited. For example, the formula described in Poupard and J. Stern "Security analysis of a practical 'on the fly' authentication and signature generation, Advances in cryptology—Eurocrypt' 98, Lecture Notes in Computer Science 1403, Springer-Verlag" 1998, p. 422-436 may be used.

The administration server 4 transmits an issued digital coupon to the wireless communication terminal 1 (508). The wireless communication terminal 1 receives the digital coupon and registers it in the list of coupons 19 within the non-volatile memory 13 (509).

A wireless communication terminal authentication process (from 621 to 626) that is performed by a wireless base station 2 will now be described.

The authentication process is performed at a stage that is different from the stage for the initialization process. The initialization process is performed only once when the wireless communication terminal 1 starts up for the first time. On the other hand, the authentication process is performed when the wireless communication terminal 1 moves to a remote network and issues a request for connection to a wireless base station 2. For example, the authentication process is performed when the wireless communication terminal 1 moves from the local network 5 to a visiting network or from one visiting network to another.

When the wireless communication terminal 1 moves to another local network, the wireless communication terminal 1 searches for a wireless base station 2 that the wireless communication terminal 1 can communicate with.

When the wireless communication terminal 1 detects the wireless base station 2 that it can communicate with, it selects one of the digital coupons recorded in the list of coupons 19 as the digital coupon to be used. The wireless communication terminal 1 then writes the value "0" as the status 193 of the digital coupon in order to record that the digital coupon is already used and invalid (620).

Next, a connection request is transmitted to the detected wireless base station 2. The connection request contains one terminal authentication key identifier 17 and one public part of coupons 442 (621).

Upon receipt of the connection request, the wireless base station 2 refers the status 255 (FIG. 5) of the list of terminal authentication keys 25 to judge whether the terminal public key 254 corresponding to the received terminal authentication key identifier 17 is valid.

If the received terminal authentication key identifier 17 is not found or the corresponding terminal public key 254 is invalid, the wireless base station 2 notifies the wireless communication terminal 1 of access denial. A case where the terminal public key 254 is invalid will be described with reference to FIG. 5.

If the terminal public key 254 is valid, the wireless base station 2 generates a random number c (622), and transmits the generated random number c to the wireless communication terminal 1 (623).

In accordance with the received random number c, the secret part of coupons 191 (x), and the terminal secret key 18 (s), the wireless communication terminal 1 calculates a response (y) using following expression (624), $$y = x + sc$$

and transmits the calculated response y to the wireless base station 2 (625).

The wireless base station 2 uses the received response y, random number c, and terminal public key 254 (v) to calculate $$g^y v^c \bmod p,$$

and judges whether the obtained calculation result agrees with the public part of coupons 442 (t) received in step 621 (626). If the two values agree with each other, the wireless base station 2 concludes that the received response y is obtained from a wireless communication terminal 1 registered in the authentication system, and then gives access permission to the wireless communication terminal 1. If, on the other hand, the two values do not agree with each other, the wireless base station 2 concludes that the wireless communication terminal 1 is not registered in the authentication system, and then notifies the terminal of access denial (627).

The above process is performed to authenticate the wireless communication terminal 1.

When the use and thrown type digital coupons are used for authentication processing as described above, the volume of calculations performed on the wireless communication terminal 1 side is 1/1000 the volume of calculations performed with the public key cryptosystem. Therefore, identification or authentication can be achieved for a small-size wireless communication terminal 1 whose computational resource and power supply capacity are limited. Further, the wireless base station 2 uses only public information to authenticate the wireless communication terminal 1. Therefore, there is no risk of information leakage. Consequently, highly safe operations can be conducted.

After connection permission is granted subsequently to successful authentication of the wireless communication terminal 1, the wireless base station 2 may establish encrypted communication or use a message authentication code to establish communication for the purpose of maintaining the secrecy of wirelessly communicated information and preventing wirelessly communicated information from being altered. For this purpose, the wireless base station 2 and wireless communication terminal 1 share an encryption key or message authentication code key. The message authentication code key is used for message authentication code generation and authentication.

The above-mentioned keys are shared in compliance with the Diffie-Hellman key exchange protocol. Alternatively, the administration server 4 may generate the encryption key or message authentication code key at the time of initialization of the wireless communication terminal 1. When the wireless communication terminal 1 connects to the wireless base station 2, the administration server 4 may transmit the encryption key or message authentication code key to the wireless base station 2.

The above keys may also be generated by the method described below.

First of all, the administration server 4 generates a secret parameter u and random number z, and calculates the expressions $$t = g^z \bmod p$$

and $$k = g^{zu} \bmod p.$$

The administration server 4 transmits the calculated values (t and k) to the wireless communication terminal 1. The wireless communication terminal 1 receives the values (t and k) and records them in the non-volatile memory 13.

Further, the administration server 4 transmits the value u to the wireless base station 2. The wireless base station 2 receives the value u and stores it in the non-volatile memory 24.

Next, the wireless communication terminal 1 transmits the value t, which is recorded in the non-volatile memory 13, to the wireless base station 2. The wireless base station receives the value t, and calculates the value $t^u$ in accordance with the received value t. The value $t^u$ serves as the encryption key or message authentication code key. The key is now shared by the wireless communication terminal 1 and wireless base station 2.

FIG. 4 shows the structure of the list of coupons 19 according to one embodiment of this invention. This list is stored in the non-volatile memory 13 of the wireless communication terminal 1.

The list of coupons 19 includes a secret part of coupons 191, a public part of coupons 192, and a status 193.

A field of the secret part of coupons 191 is used to record a random number x that is selected by the administration server 4 at the time of coupon issuance processing. The random number x is a positive integer (e.g., a 10-digit hexadecimal integer).

A field of the public part of coupons 192 is used to record a value t that is calculated from the random number x. The value t is a positive integer (e.g., a 10-digit hexadecimal integer).

A field of the status 193 is used to record information that indicates whether the associated digital coupon is valid. If the associated digital coupon is already used, it is invalid so that the value "0" is recorded in the field for the status 193.

If, on the other hand, the associated digital coupon is not used yet, it is valid so that the value "1" is recorded in the field for the status 193.

The data recorded in the list of coupons 19 are updated to the data of digital coupons added by an additional coupon issuance process that is described later.

FIG. 5 shows the structure of the list of terminal authentication keys 25, which is provided in the wireless base station 2 according to one embodiment of this invention. This list is stored in the non-volatile memory 24 of the wireless base station 2.

The list of terminal authentication keys 25 includes a terminal authentication key identifier 253, a terminal public key 254, and a status 255.

The terminal authentication key identifier 253 is a unique identification number that is assigned to each terminal authentication key. A field of the terminal authentication key identifier 253 is used to record terminal authentication key identifiers 253 assigned to all wireless communication terminals 1 that may connect to the wireless base station 2.

A field of the terminal public key 254, is used to record a calculated value v. The value v is a positive integer (e.g., a 20-digit hexadecimal integer).

A field of the status 255 is used to record information that indicates whether a wireless communication terminal 1 having the associated terminal authentication key is validly operating. When the associated wireless communication terminal 1 is validly operating, the value "1" is recorded as the status 255. If, on the other hand, the associated wireless communication terminal 1 is invalid, the value "0" is recorded as the status 255.

A wireless communication terminal 1 is invalid when, for instance, it is lost. When the user of a wireless communication terminal 1 reports that the wireless communication terminal 1 is stolen or otherwise lost, the wireless communication terminal 1 is invalidated. The wireless communication terminal 1 is also invalidated when it is rendered inoperative due to damage or defect.

Upon receipt of a connection request from a wireless communication terminal 1, the wireless base station 2 judges whether the terminal authentication key identifier 253 includes in the connection request is recorded in the list of terminal authentication keys 25. If, for instance, the wireless communication terminal 1 has not gone through the initialization process, no terminal authentication key identifier 253 is assigned to it. It is therefore not recorded in the list of terminal authentication keys 25. In such an instance, the wireless base station 2 notifies the wireless communication terminal 1 of access denial.

If the received terminal authentication key identifier 253 is recorded in the list of terminal authentication keys 25, the associated status 255 is referred to judge whether the wireless communication terminal 1, which transmitted the connection request, is validly operating. If, for instance, the wireless communication terminal 1 is stolen, the value "0" is recorded as the status 255 of the wireless communication terminal 1. It is therefore judged that the wireless communication terminal 1 is invalid. In this instance, the wireless base station 2 notifies the wireless communication terminal 1 of access denial.

If, on the other hand, the wireless communication terminal 1 is validly operating, the associated terminal public key 254 is used for authentication purposes. If the result of authentication indicates that the wireless communication terminal 1 is registered in the authentication system, the communication with the wireless communication terminal 1 begins.

Figure 6:
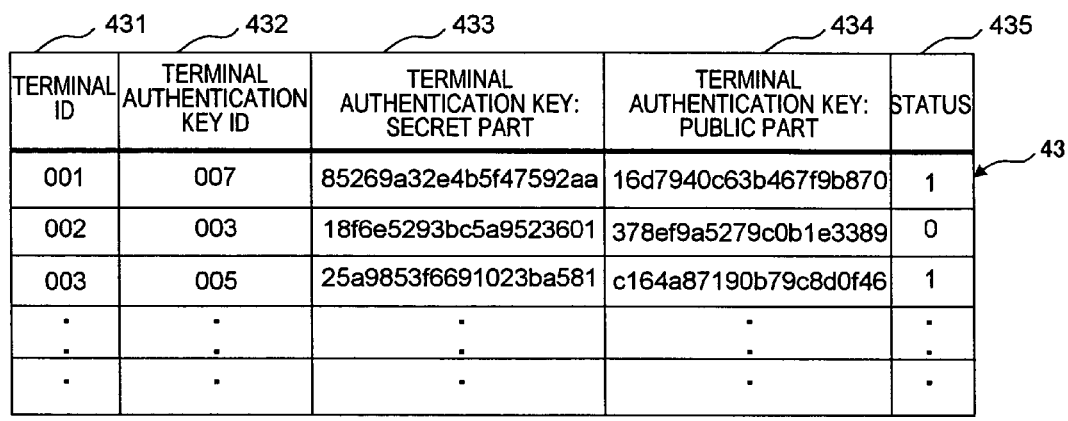
FIG. 6 shows the structure of a list of terminal authentication keys, which is provided in an administration server according to one embodiment of this invention.

FIG. 6 shows the structure of the list of terminal authentication keys 43, which is provided in the administration server 4 according to one embodiment of this invention. This list is stored in the data storage 41 of the administration server 4.

The list of terminal authentication keys 43 includes a terminal identifier 431, a terminal authentication key identifier 432, a terminal authentication key secret part 433, a terminal authentication key public part 434, and a status 435.

A field of the terminal identifier 431 is used to record the terminal identifiers 431 of wireless communication terminals 1 whose home network is a local network to which an administration server 4 having the list of terminal authentication keys 43 belongs. The terminal identifier 431 is a unique identification number that is assigned to a wireless communication terminal 1.

A field of the terminal authentication key identifier 432 is used to record the terminal authentication key identifier of a terminal authentication key that is assigned to a wireless communication terminal 1 having the associated terminal identifier 431. The terminal authentication key identifier 432 is the same as the terminal authentication key identifier 253 in the list of terminal authentication keys 25 that is stored in each wireless base station 2. However, the list of terminal authentication keys 25 records the terminal authentication key identifiers of all wireless communication terminals 1 that may connect to the wireless base station 2. On the other hand, the list of terminal authentication keys 43 records the terminal authentication key identifiers of only wireless communication terminals 1 whose home network is a local network 5 containing the administration server 4.

A field of the terminal authentication key secret part 433 is used to record a random number s that is selected by the administration server 4 at the time of registration processing. The random number s is a positive integer (e.g., a 20-digit hexadecimal integer).

A field of the terminal authentication key public part 434 is used to record a value v that is calculated from the random number s. The value v is a positive integer (e.g., a 20-digit hexadecimal integer).

The terminal authentication key secret part 433 is the same as the terminal secret part 253 of the list of terminal authentication keys 25, which is stored in each wireless base station 2. The terminal authentication key public part 434 is the same as the terminal public part 254 of the list of terminal authentication keys 25, which is stored in each wireless base station 2. However, the list of terminal authentication keys 25 records the terminal secret parts and terminal public parts of all wireless communication terminals 1 that may connect to a wireless base station 2. On the other hand, the list of terminal authentication keys 43 records the terminal authentication key secret parts 434 and terminal authentication key public parts 433 of only wireless communication terminals 1 whose home network is a local network 5 containing the administration server 4.

A field of the status 435 is used to record information that indicates whether the associated wireless communication terminal 1 is validly operating. When the associated wireless communication terminal 1 is validly operating, the value "1" is recorded as the status 435. If, on the other hand, the associated wireless communication terminal 1 is invalid, the value "0" is recorded as the status 435.

A wireless communication terminal 1 is invalid when, for instance, it is lost or rendered inoperative due to damage or defect.

Figures 7, 8:
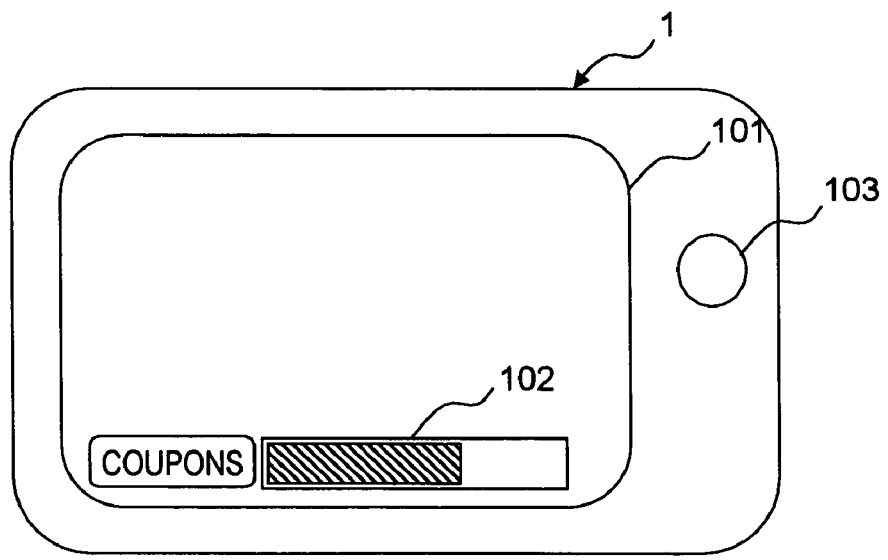
FIG. 7 shows the structure of a list of issued coupons according to one embodiment of this invention.
FIG. 8 is a schematic diagram illustrating a wireless communication terminal according to one embodiment of this invention.

FIG. 7 shows the structure of the list of issued coupons 44 according to one embodiment of this invention. This list is stored in the data storage 41 of the administration server 4.

The list of issued coupons 44 includes a secret part of coupons 441, a public part of coupons 442, a terminal identifier 443, and a status 444. The information recorded in this list indicates what digital coupons are issued to what wireless communication terminals 1.

A field of the secret part of coupons 441 is used to record a random number x that is selected at the time of coupon issuance processing. The random number x is a positive integer (e.g., a 10-digit hexadecimal integer). The secret part of coupons 441 is the same as the secret part of coupons 191 that is included in the list of coupons 19, which is stored in each wireless communication terminal 1.

A field of the public part of coupons 442 is used to record a value t that is calculated from the random number x. The value t is a positive integer (e.g., a 10-digit hexadecimal integer). The public part of coupons 442 is the same as the public part of coupons 192 that is included in the list of coupons 19, which is stored in each wireless communication terminal 1.

A field of the terminal identifier 443 is used to record the terminal identifier 443 of a wireless communication terminal 1 to which the associated digital coupon is issued. The terminal identifier 443 is the same as the terminal identifier 431 that is included in the list of coupons 19, which is stored in each wireless communication terminal 1.

For the sake of convenience, the list shown in FIG. 7 records the information about two digital coupons for each wireless communication terminal 1. More specifically, two digital coupons are issued to each wireless communication terminal 1 by performing a coupon issuance process once. However, the number of digital coupons issued by performing a coupon issuance process once is not limited to two. Any number of digital coupons may be issued by a single coupon issuance process.

A field of the status 444 is used to record information that indicates whether the associated issued digital coupon is valid. The information indicating whether a digital coupon is valid is received at predetermined timing from a wireless communication terminal 1 and recorded. If the associated digital coupon is already used, it is invalid so that the value "0" is recorded as the status 444. If, on the other hand, the associated digital coupon is not used yet, it is valid so that the value "1" is recorded as the status 444.

The field for the status 444 is not an essential element. However, when the field for the status 444 is provided, the administration server 4 can manage the information indicating the use of digital coupons possessed by individual wireless communication terminals 1.

Each time a digital coupon is issued to a wireless communication terminal 1, the information about the issued digital coupon is added to the list of issued coupons 44.

FIG. 8 is a schematic diagram illustrating a wireless communication terminal 1 according to one embodiment of this invention.

The wireless communication terminal 1 includes a display screen 101 and an operating control button (operating control unit) 103.

The display screen 101 includes an LCD (liquid-crystal display). The display screen 101 indicates the status of communication with a wireless base station 2 and shows an indicator 102.

The indicator 102 shows the status of remaining digital coupons (the number of valid digital coupons currently possessed by a wireless communication terminal 1). This makes it possible to notify the user of the wireless communication terminal 1 of the number of remaining digital coupons. A bar (hatched portion in the figure) in the indicator 102 shows the number of remaining digital coupons. The interior of the indicator 102 may alternatively be graduated to indicate the number of remaining digital coupons. Another alternative is to numerically indicate the number of remaining digital coupons.

Still another alternative is to let the indicator 102 display the number of digital coupons as the remaining battery power. When the wireless communication terminal 1 moves over a wide area to use many digital coupons in a situation where this alternative is adopted, it looks as if the remaining battery power of the wireless communication terminal 1 were decreased. This also makes it possible to urge the user of the wireless communication terminal 1 to recharge the wireless communication terminal 1 (additional digital coupon issuance).

The operating control button 103 issues a request for additional digital coupon issuance to the administration server 4. When the indicator 102 indicates that the number of remaining digital coupons is small, the user operates the operating control button 103 to issue a request for additional digital coupon issuance to the administration server 4.

The display screen 101, indicator 102, and/or operating control button 103 are not essential components of the wireless communication terminal 1.

An additional digital coupon issuance process will now be described.

When the number of valid digital coupons recorded in the list of coupons 19 is smaller than a predetermined one, the wireless communication terminal 1 requests the administration server 4 to issue new additional digital coupons. The additional issuance of new digital coupons may be automatically requested. Alternatively, the user may operate the operating control button 103 to issue an additional issuance request.

Upon receipt of the request from the wireless communication terminal 1, the administration server 4 generates digital coupons with the parameters for coupon generation 42, and transmits the generated digital coupons to the wireless communication terminal 1 via the communication network 3 and wireless base station 2.

To avoid an illegal use of digital coupons, additional digital coupons are issued only when the wireless communication network 1 is positioned within the home network. In other words, additional digital coupons are issued only when the wireless communication network 1 is connected to a wireless base station 2 within the home network. Upon receipt of a request for additional coupon issuance, in this instance, the administration server 4 confirms the address of the wireless base station 2 to which the wireless communication terminal 1, which has issued the request, is connected. The administration server 4 fulfills the request for additional coupon issuance only when the administration server 4 verifies that the wireless base station 2 is within the home network of the wireless communication terminal 1.

To assure the safety of the contents of the digital coupons to be issued, the administration server 4 may generate a message authentication code key at the time of initialization. This key is shared by the wireless communication terminal 1 and administration server 4. When a coupon issuance process is performed, the administration server 4 adds a message authentication code to the issued digital coupons. Upon receipt of the digital coupons, the wireless communication terminal 1 uses a previously owned message authentication code key to generate a message authentication code for the received digital coupons. The generated message authentication code is then compared against the message authentication code attached to the received digital coupons. The received digital coupons are recorded in the list of coupons 19 only when the message authentication codes match. This makes it possible to prevent the wireless communication terminal 1 from receiving illegal digital coupons.

A wireless communication terminal authentication method for providing user privacy protection will now be described.

The wireless communication terminal 1 may be attached to a part of a human body, for instance, for health management purposes. In this instance, the behavior record and other personal information about the user are collected through the network and conveyed to the network administrator. If the network administrator differs from the administrator of the authentication system, it is necessary to provide privacy protection for the user of the wireless communication terminal 1.

An anonymous authentication technology based on the use of a provisional name is known as a conventional authentication method. When this method is used, however, the scale of the authentication process performed on the wireless communication terminal 1 side is greater than when the aforementioned public key cryptosystem is used. Therefore, it is difficult to apply the anonymous authentication technology to a small-size wireless communication terminal 1 that operates from a small-size battery or solar battery.

Under such circumstances, the same terminal authentication key is assigned to plural wireless communication terminals 1 or plural terminal authentication keys are commonly assigned to plural wireless communication terminals 1. This makes it difficult to identify individual wireless communication terminals 1 by a terminal authentication key. In this manner, it is possible to provide privacy protection for the users of the wireless communication terminals 1.

Each wireless communication terminal 1 may possess plural terminal authentication keys. In such an instance, terminal authentication keys other than those invalidated can be used no matter whether leaked terminal public keys are invalidated. Even if one terminal authentication key is invalidated, the communication can be maintained unless all the terminal authentication keys possessed by the wireless communication terminal are invalidated. Thus, the availability of the wireless communication terminal 1 increases with the maintenance cost reduced.

For example, plural wireless communication terminals 1 share plural terminal authentication keys. The wireless base station 2 selects one of the plural terminal secret keys 18 to perform authentication.

When the above method is used, the wireless base station 2 can verify that the authenticated wireless communication terminal 1 is one of the wireless communication terminals 1 having terminal authentication keys issued by the administration server 4. However, it is not possible to identify the wireless communication terminal 1. The administration server 4 for the home network, on the other hand, can identify the wireless communication terminal 1 by comparing the digital coupon used for authentication with the list of issued coupons 44.

While the present invention has been described in detail and pictorially in the accompanying drawings, the present invention is not limited to such detail but covers various obvious modifications and equivalent arrangements, which fall within the purview of the appended claims.

What is claimed is:

1. An authentication system comprising:
a wireless communication terminal;
a base station for establishing wireless communication with the wireless communication terminal; and
an administration server for managing communication between the wireless communication terminal and the base station,
wherein the wireless communication terminal comprises a terminal side receiver transmitter module for exchanging information with the base station, a terminal side authentication module for performing an authentication process in relation to the base station and a terminal side recording module for recording digital coupons each of which includes a public part of coupon and a secret part of coupon;
wherein the base station comprises a base station side receiver transmitter module for exchanging information with the wireless communication terminal, a base station side recording module and a base station side authentication module for performing an authentication process in relation to the wireless communication terminal;
wherein the administration server generates a random number (s) as a terminal secret key (s) and calculates a value ($v=g^{-s}$ mod p) as a terminal public key (v), where the values q, p are parameters for coupon generation;
wherein the administration server generates a random number (x) as the secret part of coupon (x) and calculates a value ($t=g^x$ mod p) as the public part of coupon (t);
wherein the administration server transmits the terminal public key (v) to the base station and the terminal secret key (s) and the digital coupons to the wireless communication terminal;
wherein the base station side recording module records the terminal public key (v);
wherein the terminal side recording module records a plurality of pieces of digital coupons and the terminal secret key (s);
wherein the terminal side receiver transmitter module transmits one of the plurality of pieces of digital coupons to the base station and then invalidates the transmitted digital coupon;
wherein the terminal side receiver transmitter module transmits a connection request containing an identifier of the terminal secret key (s) and the public part of coupon (t) to the base station;
wherein the base station side authentication module generates a random number (c) upon reception of the connection request and transmits the generated random number (c) to the wireless communication terminal;
wherein the terminal side authentication module calculates a response (y=x+sc) in accordance with the received random number (c), the secret part of coupon (x) and the terminal secret key (s), and then transmits the response (y) to the base station; and
wherein the base station side authentication module authenticates the wireless communication terminal by calculating a value ($g^y v^c$ mod p) based on the received response (y), the random number (c) and the terminal public key (v) and judging whether the obtained calculation result agrees with the public part of coupons (f).

2. The authentication system according to claim 1:
wherein the terminal side recording module records a plurality of the terminal secret keys for authentication; and
wherein the terminal side authentication module selects one of the plurality of the terminal secret keys for authentication to perform an authentication process.

3. The authentication system according to claim 1,
wherein the administration server generates new digital coupons when the number of pieces of the digital coupons recorded in the terminal side recording module is smaller than a predetermined number, and transmits the generated new digital coupons to the wireless communication terminal; and
wherein the wireless communication terminal receives the generated digital coupons and records the received digital coupons into the terminal side recording module.

4. The authentication system according to claim 3, wherein the new digital coupon is generated when the wireless communication terminal is connected to a predetermined base station.

5. The authentication system according to claim 3,
wherein the administration server adds a message authentication code to the new digital coupon and transmits the new digital coupon having the message authentication code to the wireless communication terminal; and
wherein the wireless communication terminal receives the new digital coupon and judges whether the message authentication code attached to the new digital coupon coincides with a message authentication code that is generated by a previously owned message authentication key.

6. The authentication system according to claim 1,
wherein the wireless communication terminal requests the administration server for registration at startup;
wherein the administration server, upon reception the registration request, generates an identifier unique to the wireless communication terminal and the terminal secret key for authentication, and transmits generated the identifier unique to the wireless communication terminal and the generated terminal secret key for authentication to the wireless communication terminal; and
wherein the wireless communication terminal receives the generated identifier unique to the wireless communication terminal and the generated terminal secret key for authentication, and records the received identifier unique to the wireless communication terminal and the received terminal secret key for authentication in the terminal side recording module.

7. The authentication system according to claim 1,
wherein the administration server generates prime number (p) which has a predetermined number of digits and a prime number (q) which is smaller than p, and a prime factor of p−1 as the parameters for coupon generation, and
wherein the parameters for coupon generation parameters are then used to generate integer g (0<g<p), which is such that the p-based modular system order of g is q.

8. A wireless communication terminal comprising:
a receiver transmitter module for exchanging information with a base station for wireless communication,
an authentication module for performing an authentication process in relation to the base station, and
a recording module for recording a secret key (s) for authentication and digital coupons each of which includes a public part of coupon and a secret part of coupon,
wherein the recording module records a plurality of pieces of digital coupons;
wherein the authentication module calculates a response (y=x+sc) in accordance with a random number (c), a secret part (x) of one of the plurality of pieces digital coupons and the terminal secret key (s), and then transmits the response (y) to the base station;
wherein the receiver transmitter module transmits a connection request containing an identifier of the terminal secret key (s) and a public part (t) of one of the plurality of pieces of digital coupons to the base station, transmits a calculation result derived from the information transmitted from the base station and a secret part of the digital coupon, invalidates the transmitted digital coupon, and receives an authentication result from the base station; and
wherein the secret key (s) is randomly generated, and the public part of coupon (t) is calculated according to (t=$g^x$ mod p), values q, p are parameters for coupon generation.

9. The wireless communication terminal according to claim 8, further comprising an information display module for displaying the status of valid pieces of digital coupons recorded in the recording module.

10. A base station comprising:
a receiver transmitter module for exchanging information with a wireless communication terminal for wireless communication;
an authentication module for performing an authentication process in relation to the wireless communication station; and
a recording module for recording a public key (v) for authentication,
wherein the authentication module performs an authentication process by using one piece of digital coupon which includes a public part of coupon and a secret part of coupon that is received from the wireless communication terminal in a situation where a plurality of pieces of digital coupons are possessed by the wireless communication terminal,
wherein the authentication module generates a random number (c) upon reception of the connection request and transmits the generated random number (c) to the wireless communication terminal;
wherein the authentication module authenticates the wireless communication terminal by calculating a value ($g^y v^c$ mod p) based on a received response (y), the random number (c) and the terminal public key (v) and judging whether the obtained calculation result agrees with the public part of coupons (f);
wherein the terminal public key (v) is calculated according to (v=$g^{-s}$ mod p), where the values q, p are parameters for coupon generation; and
the received response (y) is calculated according to (y=x+sc), a secret part (x) is one of the plurality of pieces digital coupons and a terminal secret key (s).

* * * * *